United States Patent
Howard

(10) Patent No.: US 9,424,168 B2
(45) Date of Patent: Aug. 23, 2016

(54) SYSTEM AND METHOD FOR AUTOMATIC GENERATION OF SOFTWARE TEST

(71) Applicant: Massively Parallel Technologies, Inc., Boulder, CO (US)

(72) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 0 days.

(21) Appl. No.: 14/253,647

(22) Filed: Apr. 15, 2014

(65) Prior Publication Data

US 2014/0282412 A1    Sep. 18, 2014

Related U.S. Application Data

(63) Continuation-in-part of application No. 13/425,136, filed on Mar. 20, 2012, now Pat. No. 8,959,494.

(60) Provisional application No. 61/812,190, filed on Apr. 15, 2013, provisional application No. 61/841,004, filed on Jun. 28, 2013.

(51) Int. Cl.
| | | |
|---|---|---|
| *G06F 9/45* | (2006.01) | |
| *G06F 11/36* | (2006.01) | |
| *G06F 9/44* | (2006.01) | |

(52) U.S. Cl.
CPC .............. *G06F 11/3684* (2013.01); *G06F 8/30* (2013.01); *G06F 9/444* (2013.01)

(58) Field of Classification Search
CPC ............ G06F 17/5045; G06F 17/2775; G06F 11/3684; G06F 8/34; G06F 9/444; G06F 8/30; G06F 8/74; G10L 15/193
See application file for complete search history.

(56) References Cited

U.S. PATENT DOCUMENTS

| | | | |
|---|---|---|---|
| 5,394,347 A * | 2/1995 | Kita et al. ................... | 703/2 |
| 5,430,873 A | 7/1995 | Abe et al. | |
| 5,774,370 A | 6/1998 | Giomi | |
| 6,038,378 A * | 3/2000 | Kita et al. ................ | 714/38.11 |
| 6,201,492 B1 | 3/2001 | Amar et al. | |
| 6,718,533 B1 | 4/2004 | Schneider et al. | |
| 7,162,710 B1 | 1/2007 | Edwards et al. | |
| 2003/0079188 A1 | 4/2003 | McConaghy et al. | |
| 2003/0140332 A1 | 7/2003 | Norton et al. | |
| 2003/0149968 A1 | 8/2003 | Imai | |
| 2003/0216901 A1 | 11/2003 | Schaumont et al. | |

(Continued)

FOREIGN PATENT DOCUMENTS

| | | |
|---|---|---|
| JP | 2010097426 A | 4/2010 |
| WO | 2007104158 A1 | 9/2007 |

OTHER PUBLICATIONS

PCT Application PCT/US2013/033125 International Search Report and Written Opinion, dated Jun. 27, 2013, 8 pages.
PCT Application PCT/US2013/044573 International Search Report and Written Opinion dated Jul. 22, 2013, 8 pages.

(Continued)

*Primary Examiner* — Tuan Vu
(74) *Attorney, Agent, or Firm* — Lathrop & Gage LLP

(57) ABSTRACT

Disclosed herein is a system and method for automatically generating a test for a design process. The present system and method compares a keyword list associated with a design process and keyword lists associated with kernels and/or algorithms, temporarily associating matching kernels and/or algorithms with the design process, testing the kernels and/or algorithms with an input and designates the best output as the expected output.

7 Claims, 15 Drawing Sheets

(56) References Cited

U.S. PATENT DOCUMENTS

| | | | |
|---|---|---|---|
| 2004/0015775 A1 | 1/2004 | Simske et al. | |
| 2006/0015858 A1* | 1/2006 | Tanimoto et al. | 717/140 |
| 2006/0020949 A1 | 1/2006 | Hoshino et al. | |
| 2006/0136850 A1 | 6/2006 | Corbeil, Jr. et al. | |
| 2006/0155526 A1 | 7/2006 | Castillo et al. | |
| 2007/0294578 A1 | 12/2007 | Qiao et al. | |
| 2008/0071801 A1* | 3/2008 | Lucco et al. | 707/100 |
| 2008/0263506 A1 | 10/2008 | Broadfoot et al. | |
| 2008/0307267 A1 | 12/2008 | Chandrasekaran | |
| 2009/0077483 A9* | 3/2009 | Howard et al. | 715/771 |
| 2009/0119484 A1 | 5/2009 | Mohl et al. | |
| 2009/0132995 A1* | 5/2009 | Iborra et al. | 717/106 |
| 2009/0241106 A1 | 9/2009 | Andersen | |
| 2009/0265696 A1 | 10/2009 | Grice | |
| 2010/0153908 A1 | 6/2010 | Sarkar et al. | |
| 2011/0283095 A1 | 11/2011 | Hall et al. | |
| 2012/0066664 A1 | 3/2012 | Howard | |
| 2012/0101929 A1 | 4/2012 | Howard | |
| 2012/0144376 A1* | 6/2012 | Van Eijndhoven et al. | 717/146 |
| 2013/0144589 A1* | 6/2013 | Levi | 703/14 |

OTHER PUBLICATIONS

Ward, et al., "Structured Development for Real Time Systems," vol. 1: Introduction & Tools, Published by Prentice-Hall, Inc., 1985.
U.S. Appl. No. 13/490,345 Office Action issued Aug. 30, 2013, 16 pages.
U.S. Appl. No. 13/490,345 Response to Office Action filed Dec. 2, 2013, 10 pages.
U.S. Appl. No. 13/490,345 Notice of Allowance issued Feb. 3, 2014, 27 pages.
PCT Application PCT/US2013/044818 International Search Report and Written Opinion dated Sep. 13, 2013, 9 pages.
Yourdon, "Modern Structured Analysis," Published by PTR Prentice Hall 1989, pp. Intro to 189.
Yourdon, "Modern Structured Analysis," Published by PTR Prentice Hall 1989, pp. 190-400.
Yourdon, "Modern Structured Analysis," Published by PTR Prentice Hall 1989, pp. 401-667.
U.S. Appl. No. 14/312,639 select file history dated Sep. 12, 2014 through Dec. 8, 2014, 19 pages.
U.S. Appl. No. 13/425,136 select file history date Feb. 21, 2014 to Oct. 8, 2014, 62 pages.

* cited by examiner

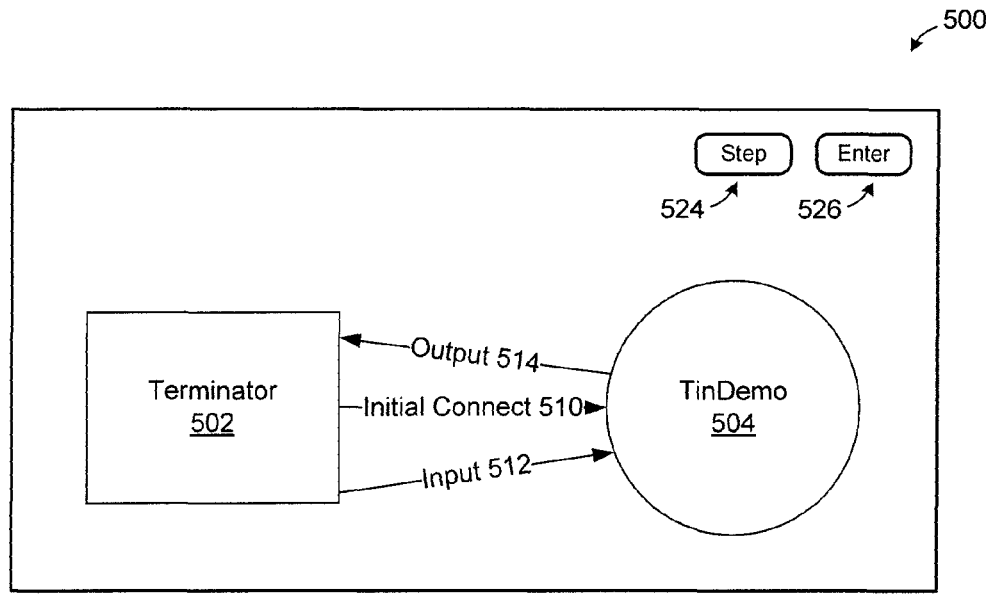
FIG. 5 – Context Level – Functional Decomposition
| Parameter Name | Data Type | Include File | Enter Value | Dimension Size | |
|---|---|---|---|---|---|
| PointCount | uint32 | Browse | | | ←610 |
| PointData | char | Browse | | | ←612 |
| PointDataSize | uint32 | Browse | | | ←614 |
| PointFormat | uint32 | Browse | | | ←616 |
| OutputFormat | uint32 | Browse | | | ←618 |
| | | | | | |
Submit ← 611
$0   $1   $2   $4   $8
~500 min  ~65 min  ~9 min  ~2 min  ~1 min
FIG. 6 - Example Data Request Screen

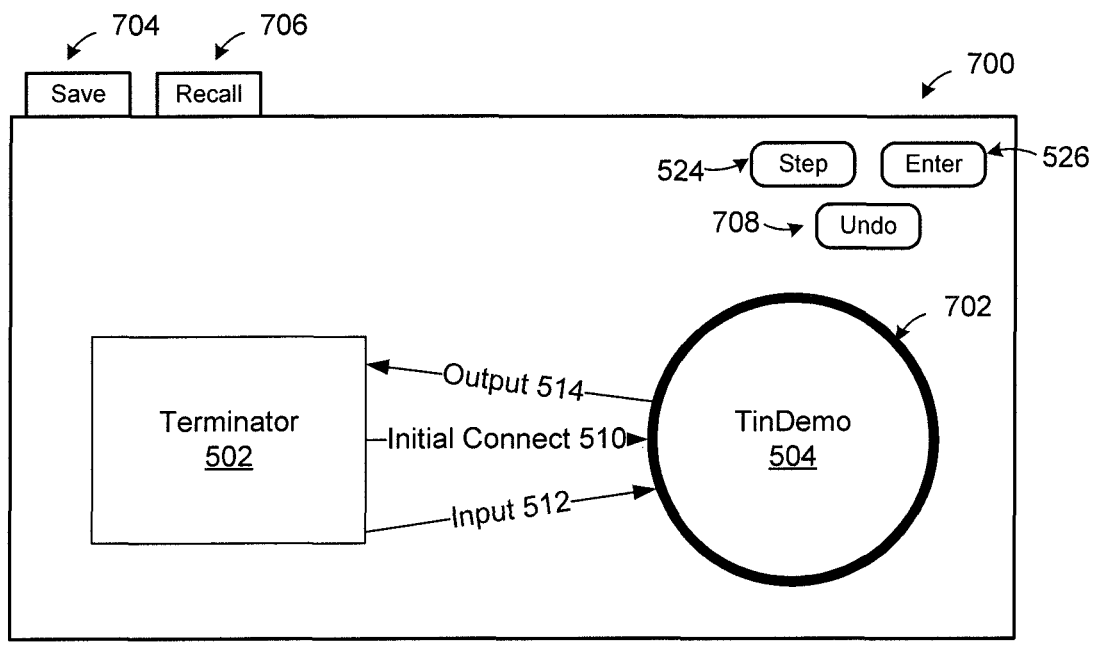
FIG. 7 – Context Level – Functional Decomposition

| Parameter Name | Data Type | Include File | Enter Value | Dimension Size | |
|---|---|---|---|---|---|
| PointCount | uint32 | Browse | 32000 | 0 | ← 1510 |
| PointData | char | Browse |  | 1 | ← 1512 |
| PointDataSize | uint32 | Browse | 0 |  | ← 1514 |
| PointFormat | uint32 | Browse | 0 |  | ← 1516 |
| OutputFormat | uint32 | Browse | 1234565 |  | ← 1518 |
|  |  |  |  |  |  |

Submit $0   $1   $2   $4   $8
~500 min   ~65 min   ~9 min   ~2 min   ~1 min

FIG. 15A

| Parameter Name | Data Type | Include File | Enter Value | Dimension Size | |
|---|---|---|---|---|---|
| PointCount | uint32 | Browse | 32000 | 0 | ← 1510 |
| PointData | char | Browse |  | 1 | ← 1512 |
| PointDataSize | uint32 | Browse | 0 |  | ← 1514 |
| PointFormat | uint32 | Browse | 0 |  | ← 1516 |
| OutputFormat | uint32 | Browse | 857453 |  | ← 1518 |
|  |  |  |  |  |  |

Submit $0   $1   $2   $4   $8
~500 min   ~65 min   ~9 min   ~2 min   ~1 min

FIG. 15B

| Test Procedure | | | | | | | |
|---|---|---|---|---|---|---|---|
| Sub Design Element | CreatePoint ▶ | CreatePoints | | | | | |
| Test Number | Parameter Name | Parameter Type | Data Type | Dimension Size | Include File | Enter Value | |
| 1 | 1610 → pTin | Output | char | 1 | Browse | value | |
| | 1612 → param5 | Output | uint32 | 0 | Browse | value | |
| | 1614 → param6 | Output | uint32 | 0 | Browse | value | |
| | 1616 → size | Input | uint32 | 0 | Browse | | |
| | 1618 → pTin | Input | char | 1 | Browse | | |
| | 1620 → param1 | Input | uint32 | 0 | Browse | | |
| Submit | | | $0 | $1 | $2 | $4 | $8 |
| | | | ~500 min | ~65 min | ~9 min | ~2 min | ~1 min |

FIG. 16

SYSTEM AND METHOD FOR AUTOMATIC GENERATION OF SOFTWARE TEST

RELATED APPLICATIONS

This application claims priority to U.S. Patent Application Ser. No. 61/812,190, titled "System and Method for Automatic Generation of Software Test", filed Apr. 15, 2013, and incorporated herein by reference. This application also claims priority to U.S. Patent Application Ser. No. 61/841,004, titled "System and Method for Automatically Associating Software Elements," filed Jun. 28, 2013, and incorporated herein by reference. This application is also a continuation-in-part of U.S. patent application Ser. No. 13/425,136 entitled "Parallelism From Functional Decomposition", filed Mar. 12, 2012, incorporated herein by references. U.S. patent application Ser. No. 13/490,345 entitled "Method For Automatic Extraction Of Designs From Standard Source Code", filed Jun. 6, 2012, is also incorporated herein by reference.

SUMMARY OF THE INVENTION

In an embodiment, the present system and method automatic generates a software test for a design process. The system and method analyzes keyword lists associated with the design process and a plurality of kernels and algorithms to generate a list of kernels and algorithms that match the design process. The system and method then temporarily associates the list with the design process and compares the input and output variables associated with design process with the kernels and algorithms on the list of kernels and algorithms. The kernels and algorithm that do not have the same input and output variables as the design process are removed for the list of kernel and algorithms The remaining kernels and algorithms are executed using an input test data associated with the design process and the output dataset is received for each executed kernel and algorithm. The systems and method then registers the selection of one of the output datasets to be expected output datasets of a test procedure for the design process.

BRIEF DESCRIPTION OF THE FIGURES

FIG. 5 shows one exemplary context level of a design process.

FIG. 6 shows one exemplary data request screen for displaying an initial data, in an embodiment.

FIG. 7 shows a context level similar to the context level shown in FIG. 5, with the addition of the design process highlighted.

FIGS. 15A and 15B show a comparison of outputs of kernels and algorithms from a list of kernels and algorithms.

FIG. 16 shows a test procedure that includes two input variables, similar to those shown in FIG. 6, and output variables, similar to those shown in FIGS. 15A and 15B.

DETAILED DESCRIPTION OF THE FIGURES

The present system and method utilizes one type of functional decomposition of a design process which results in a finite state machine (FSM). In order to attach the correct code to the states of the FSM, the present system and method utilizes a test procedure associated with the functional decomposition based design process. Each test procedure requires input data and has an expected output data. Manually constructing test procedures for every process in a complex software design is very time consuming The systems and methods disclosed herein provide an automated method of generating test procedures for functional decomposition based designs. One advantage of the present systems and methods is that they may test code segments (e.g., kernels and algorithms) prior to attaching the code segments to the states of the FSM during the design processes. This testing process confirms the compatibility of each code segment prior to finalization of the FSM.

Figure 1:
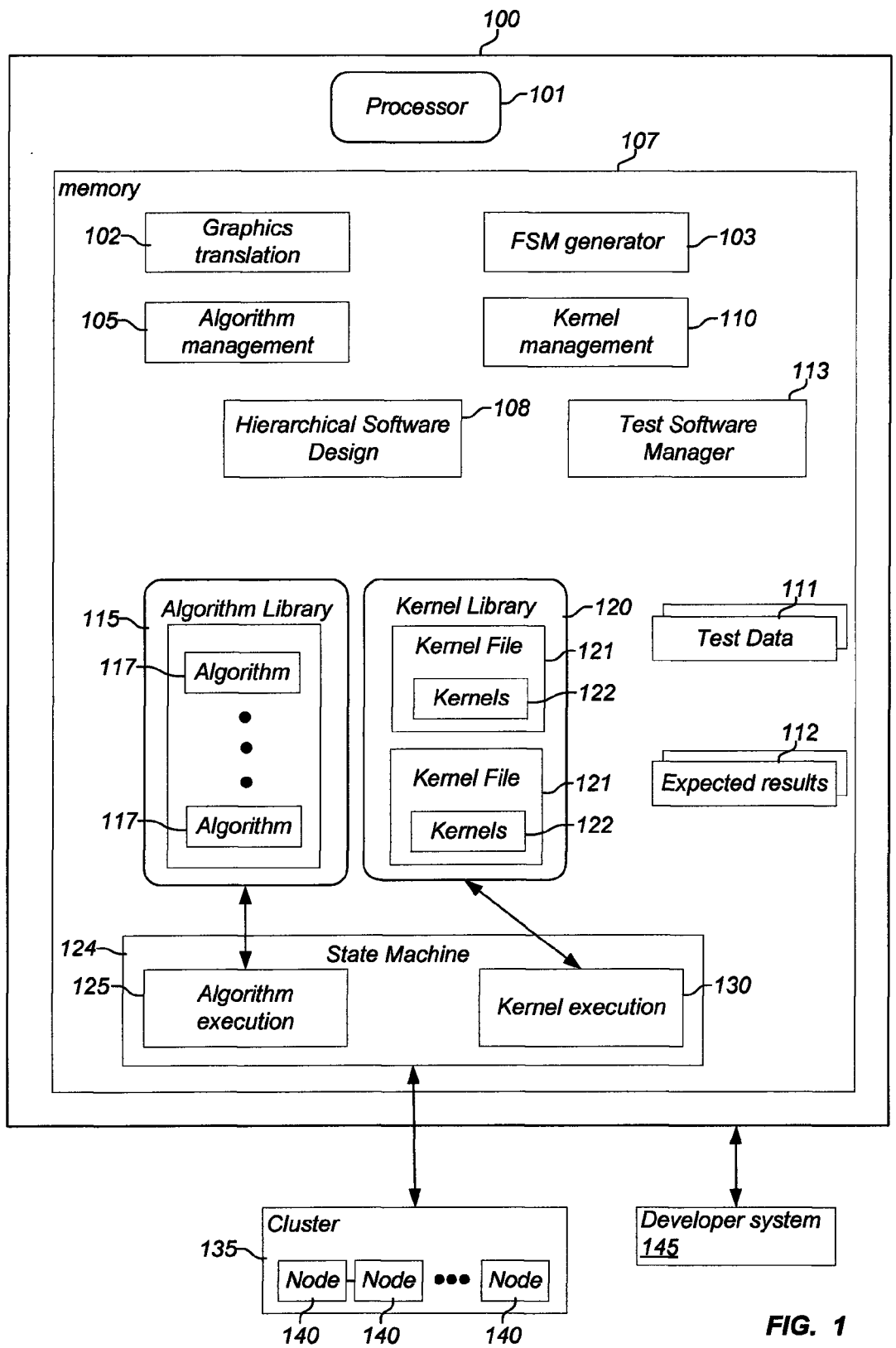
FIG. 1 is a diagram showing one exemplary system for automatic generation of software test, in an embodiment.

FIG. 1 is a diagram showing one exemplary system 100 for automatic generation of software test. System 100 includes a processor 101 and a memory 107. Memory 107 is for example implemented as one or more of RAM, ROM, FLASH, optical, and magnetic media. Memory 107 is shown storing a graphics translation module 102, an FSM generator module 103, an algorithm management module 105, a kernel management module 110, a kernel execution module 130, an algorithm execution module 125, that each comprise machine readable instructions that are executed by processor 101 to perform the functionality described herein.

A developer system 145, for example a computer that communicatively couples with system 100, is operated by a developer to develop a hierarchical software design 108, stored within memory 107. Memory 107 is also shown storing libraries 115 and 120 that include algorithms 117 and kernels 122, respectively, which may form part of hierarchical software design 108. Memory 107 is also shown storing test data 111 and expected results 112 that are used by a test software manager 113 to test one or more algorithms 117 and/or kernels 112 for use within hierarchical software design 108.

Developer system 145 is for example used to generate hierarchical software design 108 and to interact with test software manager 113 to interactively test one or more elements (e.g., algorithms 117 and kernels 122) thereof. FSM generator module 103 generates a finite state machine 124, within memory 107 for example, that controls execution of algorithms 117 and/or kernels 112 of software design 108. In one example of operation, a developer, using developer system 145, interacts with test software manager 113 to test at least part of hierarchical software design 108, wherein algorithm execution module 125 loads algorithm 117 into at least one of a plurality of nodes 140 of a cluster 135 for execution with test data 111 for input to algorithm 117. Test software manager 113 then compares output from algorithm 117, once executed by node 140, against expected results 112, to determine whether algorithm 117 is suitable for use within hierarchical software design 108.

Cluster 135 is for example a parallel processing cluster that has a plurality of computing nodes 140 that may execute algorithms 117 and kernels 122 of software design 108 under control of system 100.

System 100 may concurrently support a plurality of developer systems 145 for cooperative development and testing of hierarchical software design 108. It will be understood that the present system is not limited to the specific file names, formats and instructions presented herein. The methods described herein may be executed via system 100, or other systems compatible therewith.

Figure 2:
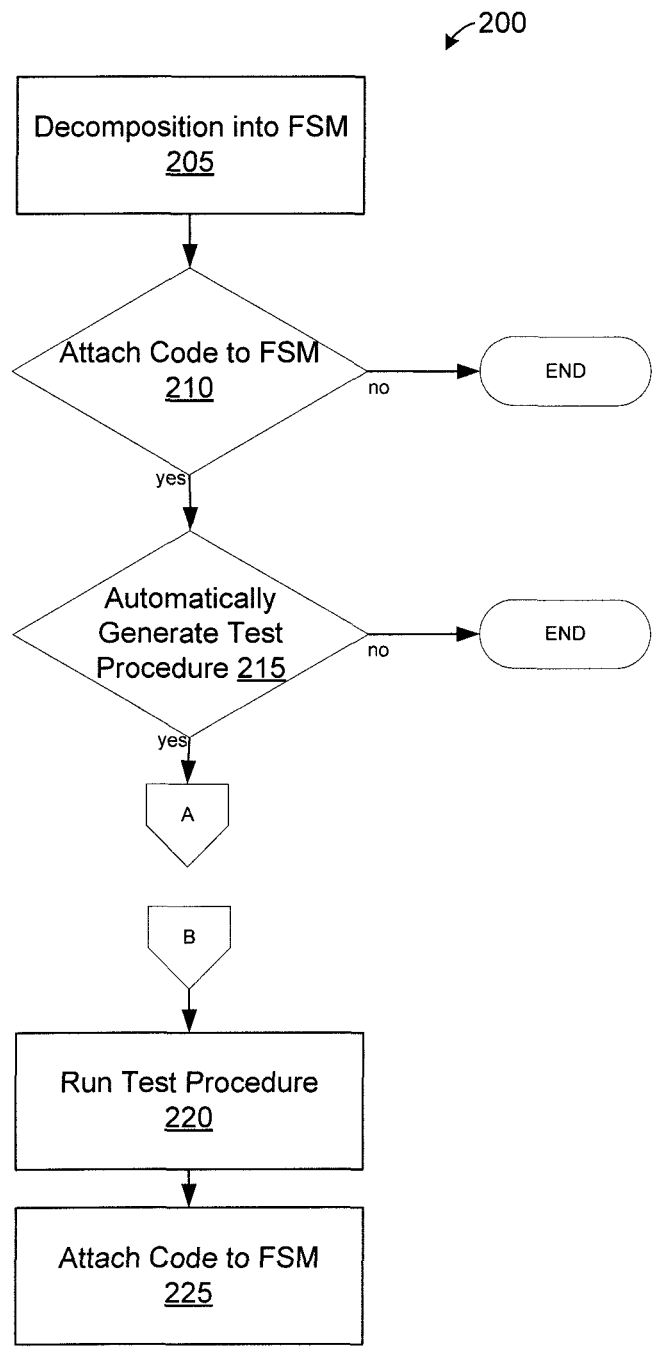
FIG. 2 shows one exemplary process for decomposing code into a FSM, in an embodiment.

In an embodiment, prior to attaching code to FSM 124, system 100 implements a process 200, FIG. 2, within FSM generator 103 to decompose (step 205) at least part of hierarchical software design 108 into FSM 124. Process 200 then determines, in step 210, whether code (e.g., one of algorithms 117 and/or kernels 122) is to be attached to FSM 124. If not, process 200 ends. Where code is to be attached to the FSM, process 200 determines, in step 215, whether a test procedure is to be automatically generated. If not, process 200 ends. Where a test procedure is to be automatically generated, process 200 invokes process 300, FIG. 3, described below, to select appropriate code from one of libraries 115 and 120 and to automatically generate a software test procedure therefore. After process 300 is complete, process 300 returns and process 200 continues with step 220, where the test procedure is run. In step 225, process 200 then attaches the automatically selected code and generated test procedure to FSM 124.

Locating Code to Attach to Process—Automated Code Sharing Model

A process of automatic code sharing is described in the below steps 1-7. These step detail locating and associating one or more code segments during a functional decomposition based design process:

1) Selecting one or more potential code segments, kernels and/or algorithms for use in a functional decomposition. Selection is done by utilizing keyword lists associated with the potential code segments, kernels, and algorithms and comparing the entries in the keyword lists with the keyword list of the code to be decomposed into a FSM.
2) Creating a list of the potential code segments, kernels and algorithms and temporarily associating those code segments, kernels, and algorithms with the design process such that the code may be decomposed into a FSM.
3) Checking the inputs and outputs of each of the potential code segments, kernels and algorithms to determine if they have the same input and output variables as the temporarily associated design process such that the code may be decomposed into a FSM.
4) Removing from the list those potential code segments, kernels and algorithms that do not have the same input and output variables as the temporarily associated design process.
5) Executing, using the input data of the test procedure associated with the design process, each of the remaining potential code segments, kernels and algorithms on the list and comparing the generated outputs to the expected output data of the test procedure associated with the design process.
6) Removing the various code segments, kernels and algorithms that do not produce the same output values as the expected output data of the test procedure.
7) Selecting the highest ranked kernel or algorithm for association with the design process, for example, by using the Constraints chapter of the requirements document.

It will be appreciated that the above method may not be complete, for example, the above process does not take into account the hierarchical nature of functional decomposition. It also does not take into account the fact that the activation of a particular design process can be predicated upon the completion of some other process.

Figure 3:
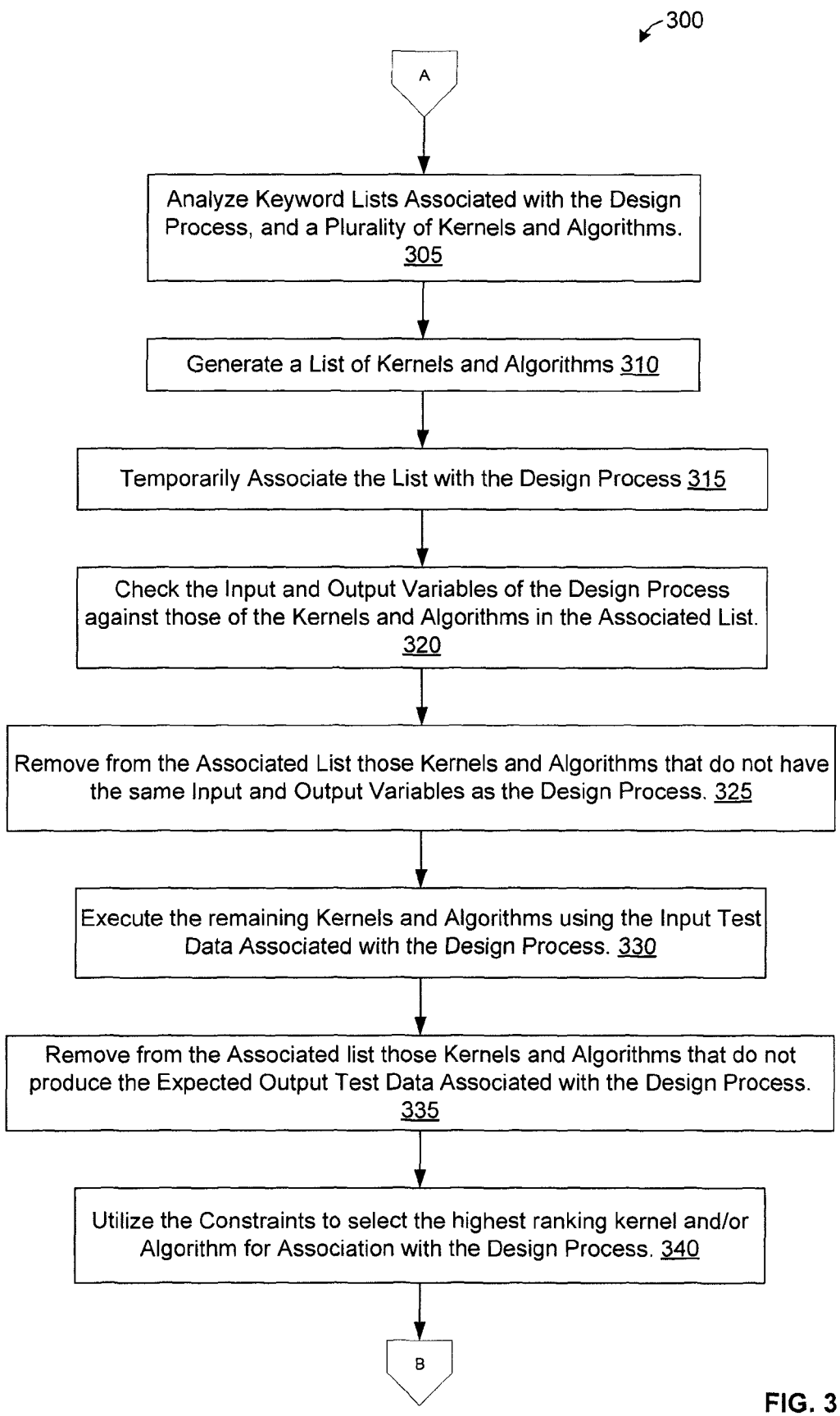
FIG. 3 shows one exemplary method for finding code that matches a functional decomposition based design process, in an embodiment.

FIG. 3 shows one exemplary method 300 of selecting code that matches an element of hierarchical software design 108 and generates an associated test procedure as follows:

In Step 305, method 300 analyzes a keyword lists associated with the element (e.g., a design process, code segment, kernel, or algorithm) of hierarchical software design 108.

In step 310, method 300 creates a list of potential code segments, kernels and algorithms that may meet functional requirements of the element of hierarchical software design 108 and, in step 315, temporarily associates the code segments with the design element.

In step 320, method 300 compares the inputs and outputs of each associated code segment, kernel and/or algorithm against those defined for the element within hierarchical software design 108, and, in step 325, method 300 removes associations for those code segments, kernels and algorithms that do not have the same input and output variables.

In step 330, method 300 executes each code segment, kernel and algorithm associated with the design element using a defined input dataset (e.g., test data 111 associated with the design element of hierarchical software design 108).

In step 335, process 300 analyses each output dataset from the executed code segments, kernels and algorithms and disassociates any code segment, algorithm, kernel, where the output dataset does not match the expected output test data (e.g., expected results 112) for that design element.

In step 340, process 300 selects the most suitable code segment that is still associated with the design element based upon ranking for use with the design element. Through use of this automatic software testing, code segments, algorithms, and kernels that do not generate expected results are not incorrectly used for the design elements. Process 300 then returns to step 220 of process 200, FIG. 2.

Keyword Lists

During development of hierarchical software design 108, the developer creates a list of keywords for each design element. Within libraries 115 and 120, each stored algorithm 117 and kernel 122 also has a list of keywords that define functionality of the code. By matching the defined keywords of the design element with keywords of the algorithms 117 and kernels 122, one or more potential algorithms/kernels may be found. A keyword list is included in the meta-data associated with shareable code blocks for example.

Input/Output

Each design element of hierarchical software design 108 that may accept a shareable code block also includes a predefined set of input and output parameters. The set of input and output parameters is necessary to ensure that the each code segment (or kernel and/or algorithm) associated with the design element has the requisite number and type of inputs and outputs. Test software manager 113 uses a test procedure (see FIG. 4 and associated description) to control input of test data 111 to each tested code segment based upon defined inputs of that code segment (e.g., kernel 122 and/or algorithm 117) during execution on one or more nodes 140 of cluster 135. The output from execution of the code segment on node 140 is compared to expected results 112 for that design element, and I the output matches the expected results 112, then the selected code segment, kernel and/or algorithm may be used to implement that design element.

Test Procedures

Figure 4:
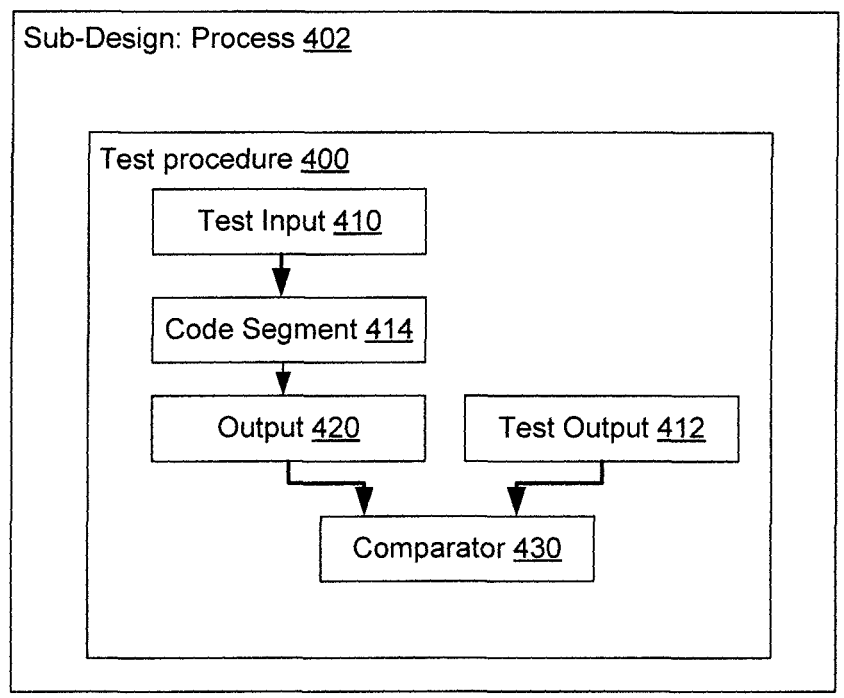
FIG. 4 shows one exemplary test procedure.

FIG. 4 shows one exemplary test procedure 400. Test procedure 400 includes one or more test inputs 410 (e.g., test data 111) along with one or more expected test outputs 412 (e.g., expected results 112). Each design element that is a process 402 may have an associated test procedure 400. Test procedure 400 defines how the associated code segment 414 is tested to ensure that code segment 414 meets the requirements of process 402 (i.e., the design element of hierarchical software design 108). Code segment 414 is executed to process test input 410 and generate output 420, as discussed above. Test output 412 (e.g., expected results 112) is compared, via comparator 430, to output 420 to determine whether code segment 414 properly processes test input 410. In this way code segments, like code segment 414, are tested to determine compatibility with one design element of hierarchical software design 108 prior to using the code segment to implement the design element.

Constraints

A constraint or set of constraints (hereinafter "the constraint") are the final criteria for selecting the code segment for association with the process. The constraint is used to select a specific code segment from the list of code segments that have passed the process's test procedure (See FIG. 4, described above). Examples of the constraint include, but are in no way limited to, a performance constraint, a cost constraint, a memory requirement constraint, a compatibility constraint, number of node constraint, Amdahl Scaling (code segments with the best parallel performance), etc. Other constraints may be utilized without departing from the scope here, as long as the constraint facilitates at least narrowing the selection of code segments from the list of code segments. In one example of the performance constraint, reduced processing time may be defined.

Locating Code to Attach to Process—Automated Test Procedure Model

A further improvement to the Automated Code Sharing method, described above, includes taking into account hierarchy and process activation order, to allow for a novel automated creation of test procedures (e.g., test procedure 400 of FIG. 4).

In one example, an exemplary context level 500 of hierarchical software design 108 is created, as shown in FIG. 5. Context level 500 includes an initial terminator 502 connected 510-514 to a TinDemo 504 that represents a decomposable process of hierarchical software design 108. Initial terminator 502 is used to define an initial dataset (e.g., test data 111, not shown) for use as input data 512 to a first activated process at the first decomposition level, described in more detail in association with FIG. 8. Context Level 500 additionally includes a Step 524 button and an Enter 526 button.

When working at the context level (e.g., context level 500), the initial terminator 502 may display its initial dataset. One example of a displayed initial data set is shown displayed by a data request screen 600, FIG. 6.

In one embodiment, values may be entered into the various data fields 610-618, FIG. 6. Selecting a Submit button 611 returns the user to the Context Level, shown as Context Level 700, FIG. 7. In the example of FIG. 7, Context Level 700 differs from Context Level 500 in that TinDemo 504 is highlighted 702, and Context Level 700 includes Save 704, Recall 706, and Undo 708 buttons.

System 100 waits for the user to either (1) step through the currently highlighted process, by selecting Step 524 button, or (2) enter the currently highlighted process, by selecting Enter 526 button. Selecting Step 524 button causes system 100 to find code that matches the functional decomposition based design process.

Figure 8:
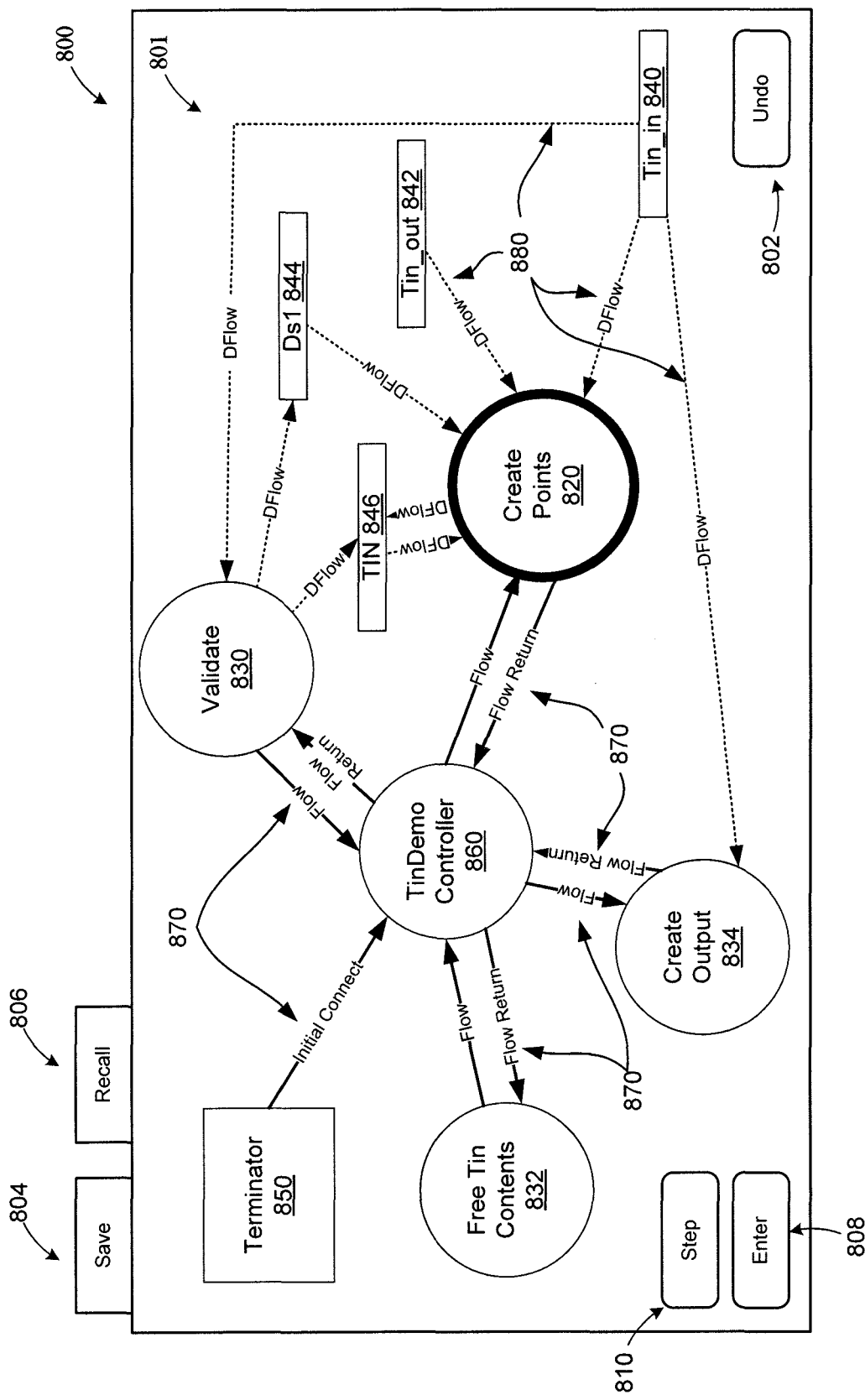
FIG. 8 shows one exemplary user interface of the system of FIG. 1 for interacting with a decomposed process.
Figure 9:
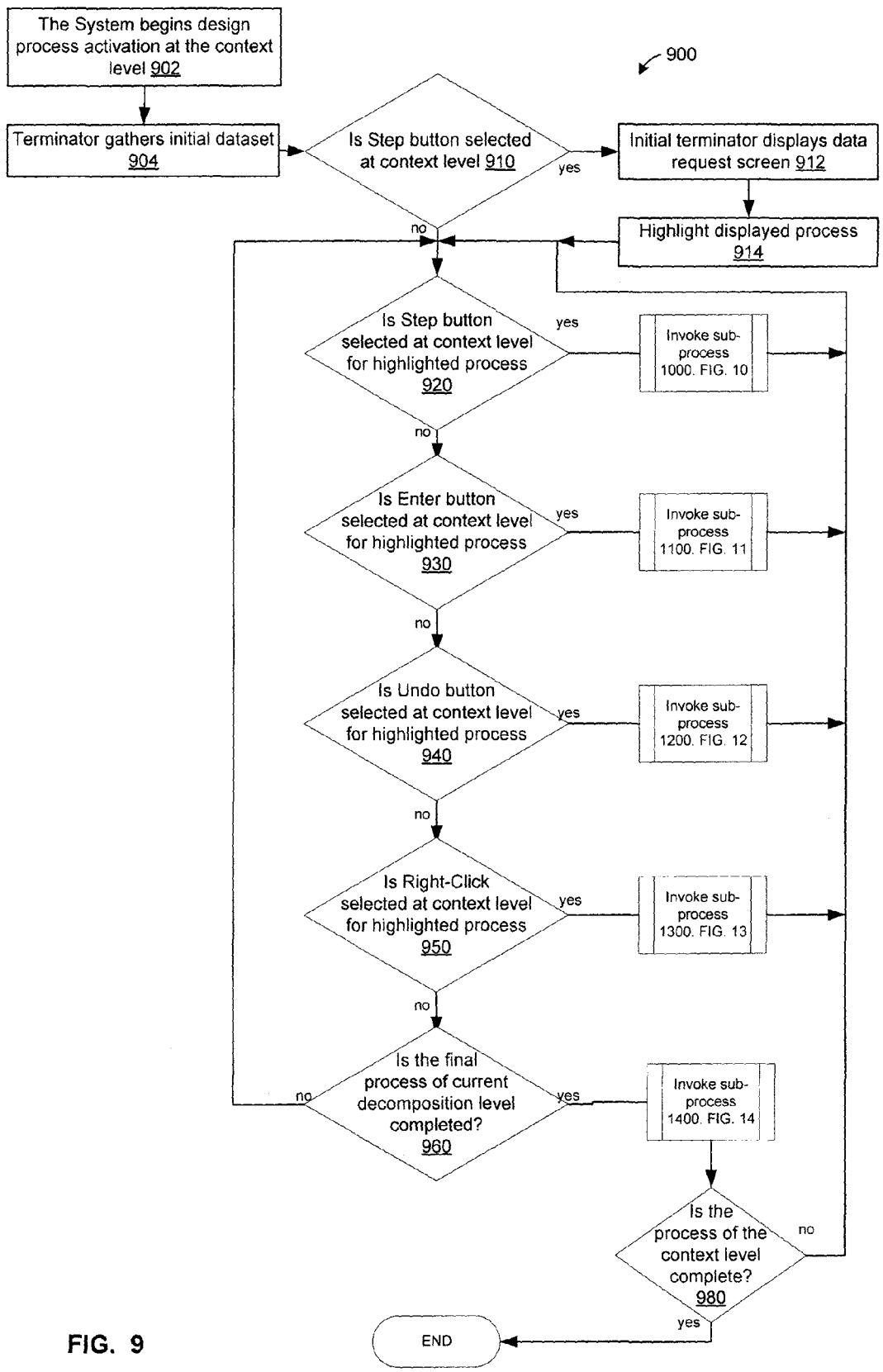
FIG. 9 shows one exemplary method for processing and automatically generating a test for a design process, in an embodiment.
Figure 10:
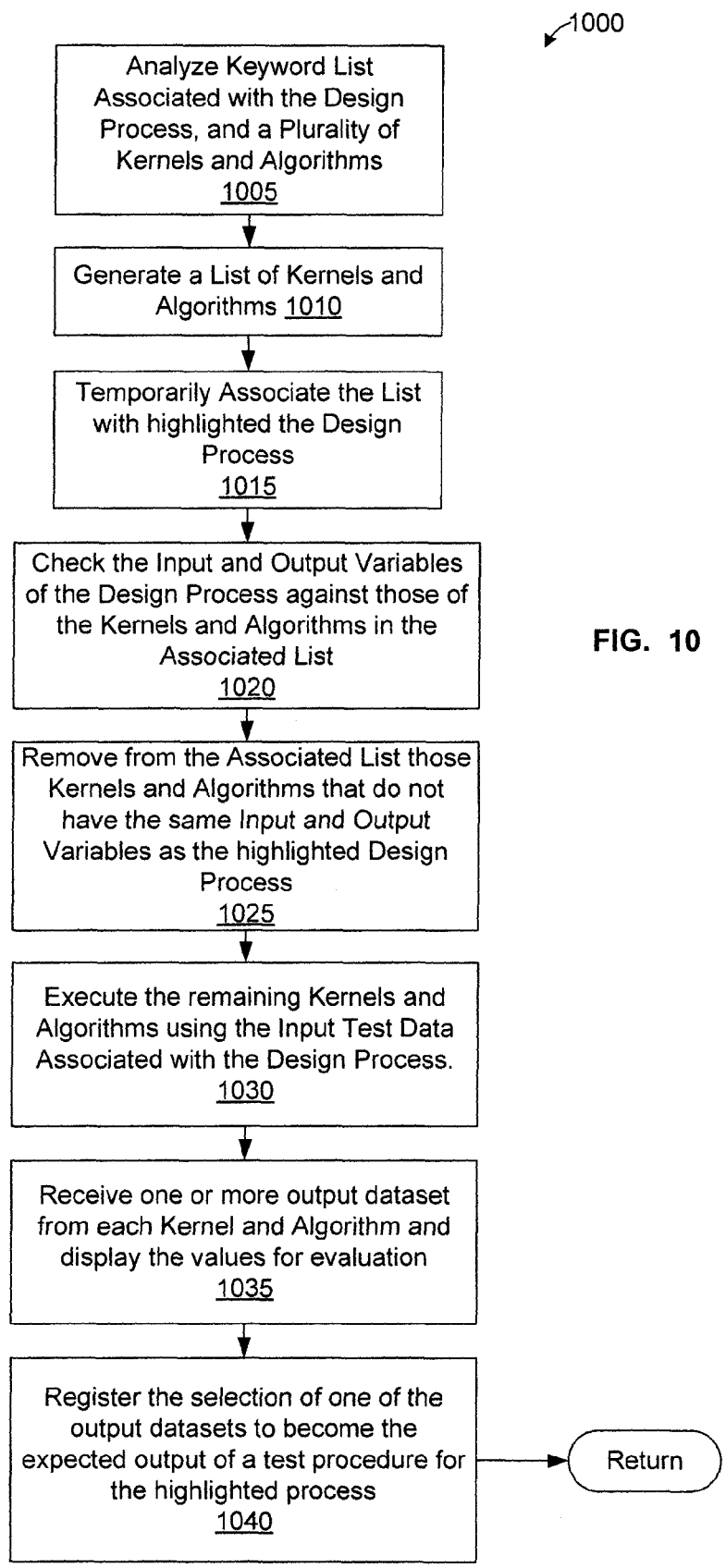
FIG. 10 shows one exemplary method for associating an output data set with a process, in an embodiment.
Figure 11:
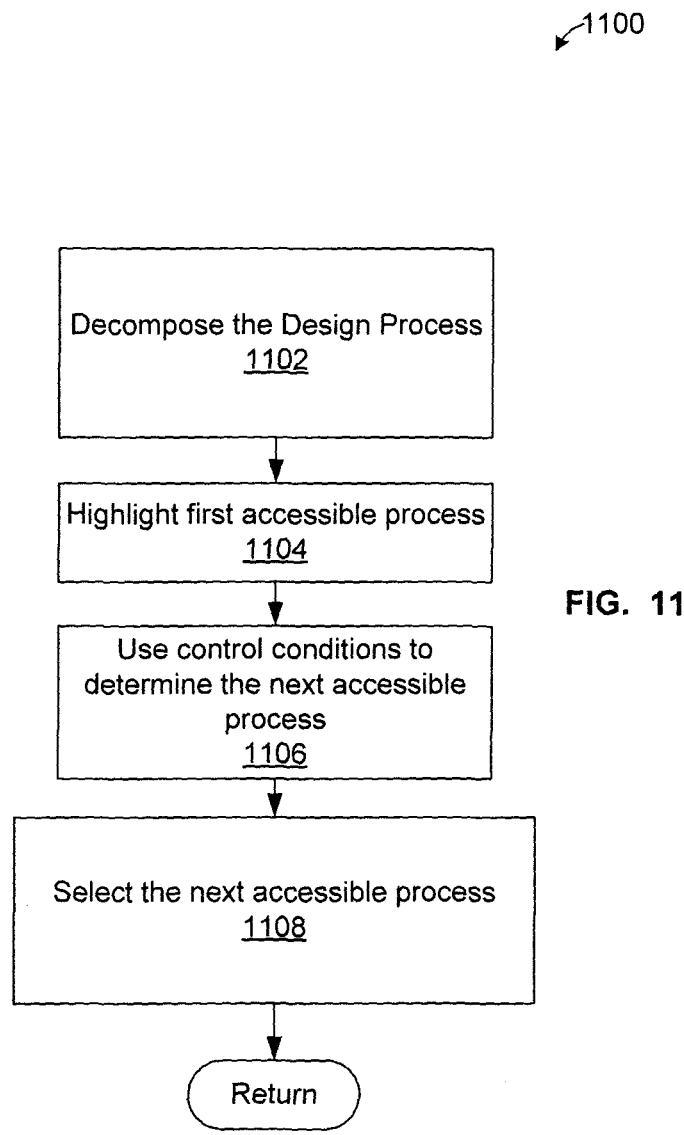
FIG. 11 shows one exemplary method for entering the design process and selecting an accessible process, in an embodiment.

FIG. 8 shows an exemplary user interface 800 for interacting with a decomposed process 801, which in this example is decomposed process TinDemo 504 of FIG. 5. Interface 800 is one exemplary automated test procedure model for interacting with system 100 for locating code to attach to a design process, in this example, decomposed TinDemo 504. Interface 800 displays a Terminal 850, a control process TinDemo Controller 860, highlighted process Create Points 820, non-decomposable processes 830-34, and data storage elements Tin_in 840, Tin_out 842, Ds1 844, TIN 846. Also shown are control conditions 870 and Data Flows 880. Examples of control conditions 870 include, but are not limited to, Initial Connect, Flow, and Return Flow. Five buttons are also shown, which provides, at least in part, a user interface to system 100; Undo 802, Save 804, Recall 806, Enter 808, and Step 810.

A user may select and highlight 702 TinDemo 504 process (FIG. 7) from exemplary TinDemo Project. The user may then select Enter 526 button (FIG. 7), to cause system 100 to decompose the selected decomposable process TinDemo 504 into decomposed process 801, FIG. 8, in which a first accessible process, for example, process 820, is highlighted. Control conditions 870 link control process 860 to one or more other processes. In the embodiment shown in FIG. 8, control conditions 870 connect TinDemo Controller 860 to Terminator 850, highlighted process Create Points 820, and non-decomposable processes 830-34. System 100 (FIG. 1) uses control conditions, displayed in FIG. 8 as control conditions 870, to determine the next accessible process. In FIG. 8, the next available process is highlighted, shown as highlighted process Create Points 820.

After the process is selected/highlighted, the system initiates the process for finding code that matches the functional decomposition based design, described in more detail below.

Selection of Undo 802 button causes system 100 to reset the input and output dataset and the control variables of the last executed process to the pre-execution values. This results in the most recently executed process to be the next process to be executed.

Selecting a highlighted process allows the user to change the input dataset of the process to a different value by causing the data request screen (similar to data request screen 600, FIG. 6) of the highlighted process to be displayed. One example of selecting a highlighted process to change the input dataset is "right click" the highlighted process utilizing a mouse or similar input device. In an embodiment, if the user does not change the input dataset of the process, then the prior generated output values are used as input values of the next highlighted process.

When the final process of a decomposition level has completed the next step leaves that decomposition level and goes up one decomposition level. The next process of that level is highlighted. All test procedures are complete when the process of the context level is complete.

At any point, a terminator (e.g., terminator 850 of FIG. 8) that is associated with a process may require additional data. For example, system 100 may request data from the user via development system 145 by displaying a terminator associated data request screen, similar to data request screen 600, FIG. 6. The user may enter data into the data request screen, then submit the data by selecting submit button 611 to save the entered data as test procedure input values for the next highlighted process. Processes may be added, changed, and/or deleted on-the-fly without starting over. In addition, Control may be added, changed, and or deleted on-the-fly without starting over.

Progress of the testing process may be saved and recalled using the Save 804 and Recall 806 buttons, respectively. Selecting Save 804 button causes system 100 to save the test information for later recall. In one example, a save Popup screen (not shown) is displayed. In an embodiment, a test name may be entered utilizing the save Popup screen. System 100 may then be caused to save the test information for later recall for example, via a user interface. Selecting Recall 806 button causes system 100 to restart the testing at the last test point. In one example, pressing Recall 806 button causes a Recall screen (not shown) to be displayed. In an embodiment, a test run name may be entered selecting an "enter" key will cause the system to restart the testing at the last test point.

FIGS. 9-13 disclose an automated method 900 for generating test procedures for functional decomposition based designs (e.g., hierarchical software design 108, FIG. 1). FIGS. 9-13 are best viewed in combination with FIGS. 5-8.

In steps 902 and 904 of process 900, a design process is activated at the context level and a terminator gathers an initial dataset (e.g., test data 111). The initial dataset is used as the first input data for the first activated process at the first decomposition level. One example of activating a design process at a context level and an terminator gathering an initial dataset is system 100 activating context level 500 (FIG. 5) and terminator 502 connecting to design process Tine Demo 504, via an initial connect 510. Terminator 502 then gathers, via an input 512 and an output 514, an initial data set (not shown) for design process TinDemo 504.

In decision step 910, process 900 determines if the design process is to be stepped through. In one example of process 900 determining if a design process is to be stepped through is system 100 determining if Step button 524 is selected, for example by a user, for highlighted 702 design process TinDemo 504. If, in step 910, determines process 900 determines the design process is not to be stepped through, process 900 continues with step 920. If, in step 910, process 900 determines that the design process is to be stepped through, process 900 continues with step 912, where process 900 requests design process related data. Step 912 then continues with step 914. In step 914, process 900 visually identifies the selected design process. In one example of steps 912 and 914, initial terminator 502 displaying design process TinDemo 504 related data and highlighting 702 TinDemo 504. Step 914 then continues with decision step 920.

In decision step 920, process 900 determines that the visually identified design process is to be stepped through. One example of determining if the visually identified design process is to be stepped through is system 100 determining if Step 524 button is selected for highlighted 702 design process TinDemo 504. If, in step 920, process 900 determines that visually identified design process is to be stepped through, then process 900 invokes process 1000, FIG. 10.

Step 1005 of process 1000 analyzes the keyword list associated with the design process, and a plurality of kernels and algorithms.

Step 1010 generates a list of kernels and algorithms the match the key word list of the design process.

Step 1015 temporarily associates the generated list of kernels and algorithms with the design process.

Step 1020 checks the input and output variables of the design process against those of the kernels and algorithms in the associated list.

Step 1025 removes from the associated list those kernels and algorithms that do not have the same input and output variables as the design process.

Step 1030 executes the remaining kernels and algorithms using the input test data associated with the design process.

Step 1035 receives one or more output dataset from each kernel and algorithm and displays the values for evaluation.

Step 1040 registers the selection of one of the output datasets to become the expected output of a test procedure for the highlighted process. Step 1040 then returns to process 900 at step 920. One example of a comparison of output values is shown in FIG. 15.

If, in step 920, process 900 determines that visually identified design process is not to be stepped through, then process 900 continues with step 930.

In decision step 930, process 900 determines if a selected design process is to be entered into. One example determining if a selected design process is to be entered into is detecting if Enter button 526 is selected. If a selected design process is to be entered into, process 900 invokes process 1100, FIG. 11.

In step 1102 process 1100 decomposes the design process. One example of decomposing a process is decomposing highlighted 702 design process 504, FIG. 7, into decomposed design process 801, FIG. 8.

In step 1104, process 1100 selects the first accessible process. One example of selecting the first accessible process is selecting Create Points 820 process, FIG. 8, and visually identifying it by, for example, highlighting Create Points 820.

In step 1106 process 1100 utilizes control conditions to determine the next accessible process.

In step 1108 process 1100 selects the next accessible process. One example of selecting the next accessible process is selecting TinDemo Controller 860 and visually identifying the selected process by highlighting. Process 1100 then returns to process 900 at step 920.

If, in decision step 930 of process 900, a selected design process is not to be entered into, process 900 continues with decision step 940.

Figure 12:
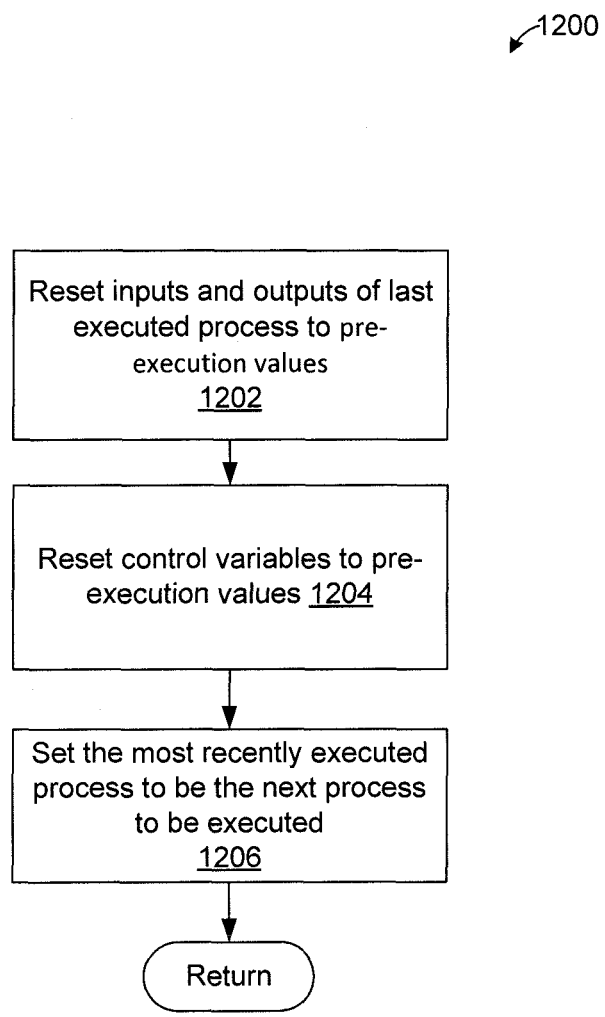
FIG. 12 shows one exemplary method for undoing a previous step, in an embodiment.
Figure 13:
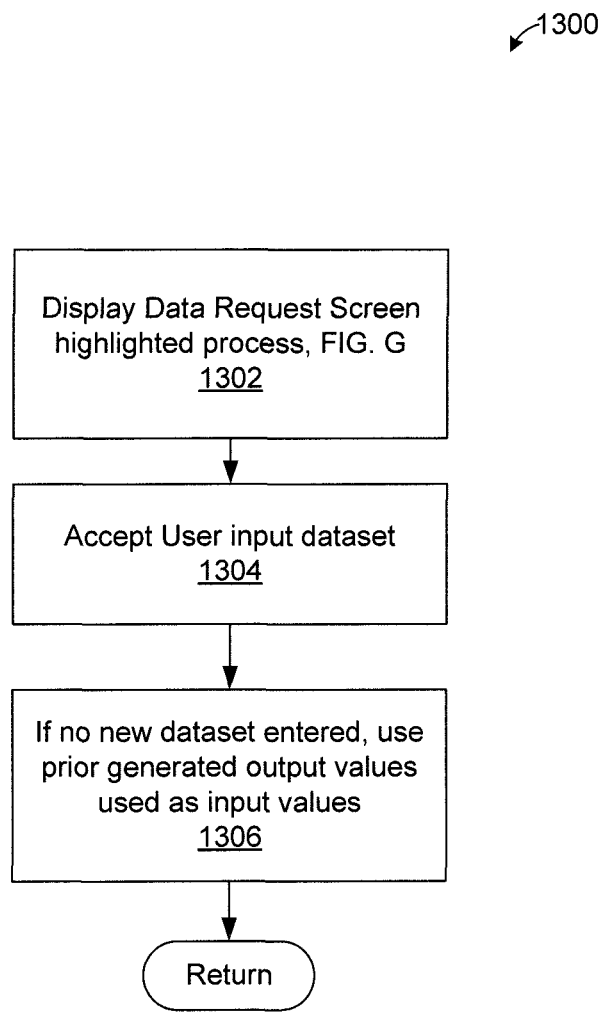
FIG. 13 shows one exemplary method for manually entering an input dataset, in an embodiment.

In decision step 940, process 900 determines if a previous process or step is to be "undone." One example of undoing a previous step is selecting Undo 802 button, which reverses or undoes a previously executed process or step of process 900. If process 900 determines that a previous process or step is to be "undone," process 900 invokes process 1200. FIG. 12.

In step 1202 process 1200 resets the inputs and outputs of the last executed process(es) to pre-execution values. Step 1204 then resets the control variables to pre-execution values. Step 1206 then sets the most recently executed process to be the next process to be executed. Process 1200 then returns to process 900 at step 920.

If, in step 940, process 900 determines that a previous process or step is not to be "undone," then process 900 continues with decision step 950.

In step 950 process 900 determines if a user has initiated a change to the input dataset. One example of determining if a user has selected a change of the input dataset is detecting a right click on a process, for example detecting a right click on Create Points 820, by a user. If it is determined that a user has initiated a change to the input dataset, step 950 invokes process 1300, FIG. 13.

Step 1302 of process 1300 displays a data request screen for the selected process. One example of displaying a data request screen is displaying screen 600 of FIG. 6. Step 1304 then accepts the user entered data into the dataset, for example by storing the user entered data in memory accessible by terminator, for example, terminator 502, 850. If no new dataset is entered, Step 1306 flags the previously generated output values to be used as input values. In one example of step 1306, process 1300 saves the output data from the previously processed process 820 as the input dataset to the currently processed process 860. Process 1300 then returns to process 900 at step 920. If Step 950 does determines that a user has not initiated a change to the input dataset, process 900 continues with decision step 960.

Figure 14:
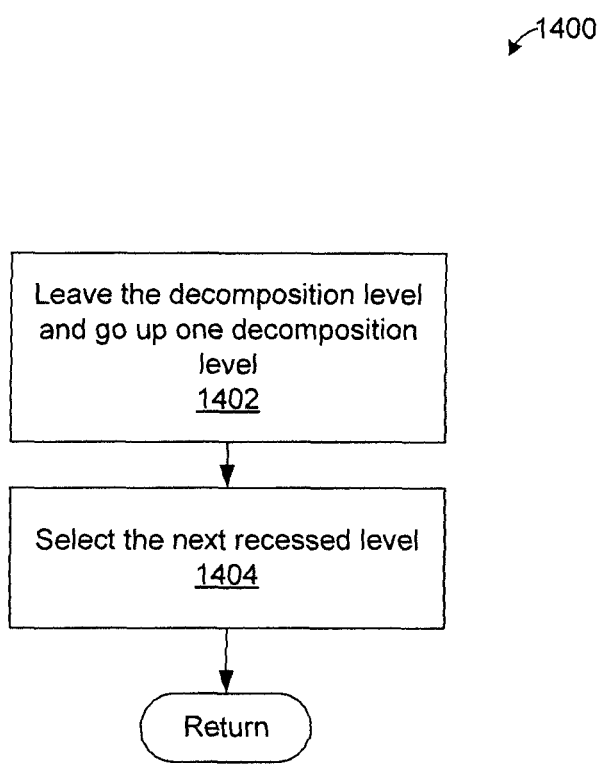
FIG. 14 shows one exemplary method for accessing the next recessed level, in an embodiment.

In decision step 960 process 900 determines if the final process of the decomposition level is completed. If process 900 determines that the current process is the final process in the decomposition level, process 900 continues with process 1400, FIG. 14. In step 1402 process 1400 leaves the decomposition level and goes up one decomposition level and, in step 1404, process 1400 selects the next recessed level. Process 1400 then returns to process 900 at decision step 980. If Step 960 determines that the final process of the decomposition level is not completed, process 900 continues with step 920.

In step 980, process 900 determines if processing the context level is complete. If process 900 determines that processing the context level in not complete, step 980 continues with step 920. If process 900 determines that processing the context level is complete, process 900 ends.

FIGS. 15A and 15B show a comparison of outputs of kernels and algorithms from a list of kernels and algorithms. Outputs 1510-1516 have similar values 1520. FIGS. 15A and 15B differ in that output 1518 of FIG. 15A has a value 1520 of 1234565 and a value of 857453 in FIG. 15B. These are the types of differences that may be utilized in the comparison process for selecting an output to the expected output for a process, see FIG. 16 for more detail.

FIG. 16 shows a test procedure that includes two input variables, similar to those shown in FIG. 6, and output variables, similar to those shown in FIG. 15A and 15B. Here, the input data and the output data are combined into one test procedure 1600. A test procedure is associated with a process or a Sub Design Element. In the example of FIG. 16, test procedure 1600 is associated with Sub Design Element "CreatePoints." In test procedure 1600, pTin 1610, param5 1612, and param6 1614 are output parameter types and size 1616, pTin 1618, and param1 1620 are input parameter variables. A test procedure is used to insure that code meet the requirements of the design process. Input variables 1616-1620 of a test procedure serve as the input variables of some to-be-tested code. The expected output variables 1610-1614 of the test procedure serve as the indication that the code properly processes the input data. Thus, before code is associated, it is first tested.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for the automatic generation of a software test for developing a hierarchical software design, comprising:
analyzing, utilizing a digital processor,
a first keyword list associated with a design process element within a graphical representation of the hierarchical software design, a second keyword list associated with each of a plurality of kernels and/or algorithms, wherein the first keyword list defines functionality of the design process element and the second keyword list defines functionality implemented by the plurality of kernels and/or algorithms;
generating, based on the step of analyzing, a list of kernels and/or algorithms that match the design process element;
temporarily associating the list with the design process element;
comparing, utilizing the digital processor, input and output variables defined for the design process element with those of the kernels and/or algorithms on the list;
removing those kernels and/or algorithms from the list that do not have the same input and output variables as the design process element;
executing, utilizing the digital processor, each kernel and/or algorithm remaining on the list of kernels and algorithms using an input test data associated with the design process element;
receiving one or more output datasets from each executed kernel and algorithm;
selecting one of the output datasets to be an expected output dataset of the test procedure for the design process element; and
selecting one of the kernels and/or algorithms on the list and having an output dataset that are the same as the expected output dataset, based on one or more constraints including scaling, performance, price, and memory use, the selected kernel or algorithm being associated with the design process element.

2. The method of claim 1, wherein the step of comparing comprises comparing the number inputs and outputs of the design process element with each kernel and/or algorithm on the list.

3. The method of claim 1, wherein the step of comparing comprises comparing the types of input and output variables of the design process element with the input and output variables of each kernel and/or algorithm on the list.

4. The method of claim 1, wherein the step of selecting comprises providing functionality to facilitate a user to evaluate and select one of the output datasets to be an expected output dataset of the test procedure for the design process element.

5. The method of claim 1, further comprising registering the selected output dataset to be the expected output dataset of the software test for the design process element.

6. The method of claim 1, wherein the method for the automatic generation of a software test utilizes hierarchy and process activation order in the creation of test procedure.

7. A system for the automatic generation of a software test for developing a hierarchical software design, the system utilizing a processor and non-volatile memory, comprising:
a keyword list analyzing module, stored in memory and executed by the processor, for analyzing a first keyword list associated with a design process element of a graphical representation of the hierarchical design, a second keyword list associated with each of one or more kernels and algorithms, wherein the first keyword list defines functionality of the design process element and the second keyword list defines functionality implemented by the one or more kernels and algorithms;
a matching module, stored in memory and executed by the processor, for generating
a list of kernels and/or algorithms that match the design process element;
an association module, stored in memory and executed by the processor, for temporarily associating the list with the design process element;
a comparison module, stored in memory and executed by the processor, for comparing the input and output variables defined for the design process element with those of the kernels and/or algorithms on the list;

a removal module, stored in memory and executed by the processor, for removing those kernels and/or algorithms from the list that do not have the same inputs and outputs as the design process element;

an execution module, stored in memory and executed by the processor, for executing each kernel and/or algorithm remaining on the list of kernels and algorithms using an input test data associated with the design process element;

a receive module, stored in memory and executed by the processor, for receiving one or more output datasets from each executed kernel and algorithm;

a register module, stored in memory and executed by the processor, for registering the selection of one of the output datasets to be expected output datasets of a test procedure for the design process element; and a selection module, stored in memory and executed by the processor, for selecting one of the kernels and/or algorithms remaining on the list and having output datasets that are the same as the expected output dataset, based on one or more constraints including scaling, performance, price, and memory use, the selected kernel or algorithm being associated with the design process element.

* * * * *